United States Patent [19]
Kelley

[11] Patent Number: 6,078,921
[45] Date of Patent: Jun. 20, 2000

[54] METHOD AND APPARATUS FOR PROVIDING A SELF-SERVICE FILE

[75] Inventor: Winslow B. Kelley, Naticle, Mass.

[73] Assignee: Trellix Corporation, Waltham, Mass.

[21] Appl. No.: 09/034,662

[22] Filed: Mar. 3, 1998

[51] Int. Cl.[7] .................................................. G06F 17/30
[52] U.S. Cl. .............................. 707/10; 1/6; 1/8; 1/201; 1/202; 1/101
[58] Field of Search .............................. 707/1, 6, 8, 101, 707/201, 10, 202; 705/35, 45, 207, 513; 709/203, 228, 246; 713/201; 345/336; 379/21; 463/40

[56] References Cited

U.S. PATENT DOCUMENTS

| | | | |
|---|---|---|---|
| 5,699,486 | 12/1997 | Tullis | 395/2.79 |
| 5,745,908 | 4/1998 | Anderson | 707/513 |
| 5,838,910 | 11/1998 | Domenikos | 395/200.33 |
| 5,895,455 | 4/1999 | Bellinger | 705/35 |
| 5,920,873 | 7/1999 | Van Huben | 707/202 |

*Primary Examiner*—Thomas G. Black
*Assistant Examiner*—Diane D. Mizrahi
*Attorney, Agent, or Firm*—The Hecker Law Group

[57] ABSTRACT

The invention provides a system to convert multi-part files into a single file for use and transfer. The invention combines a "portable server implementation" with a concatenation of the individual files of a multi-part file to create a single file instantiation. When the single file is opened, the server controls the presentation of appropriate files of the multi-part file using standard agents on a computer.

32 Claims, 9 Drawing Sheets

METHOD AND APPARATUS FOR PROVIDING A SELF-SERVICE FILE

BACKGROUND OF THE INVENTION

1. Field of the Invention

This invention relates to the field of data communications.

2. Background Art

A computer user may work with data which is found in more than one computer file. Such data may be found in related but separate computer files, or in documents which are in fact comprised of several files. Some documents appear as a single file when displayed, but are composites of several separate but linked files. For example, so called World Wide Web pages (WWW pages or web pages) may in fact consist of separate text, image, and/or multimedia files. Further, a web site might consist of several web pages. Herein, such data is referred to as multi-part files. Currently there are disadvantages in working with such multi-part files. For example, it is difficult to transfer multi-part files from computer to computer. The disadvantages can be understood by a review of the transfer of multi-part files.

A computer user can transfer files to another computer user using any of many well known systems, such as electronic mail (e-mail), file sharing, network transfers, removable media, downloading, File Transfer Protocol (FTP) and others. Alternatively, a computer user may desire to make it easier to use multi-file documents on a computer without transfer.

Currently, multi-part files are stored on a computer as separate files in one or more file directories. To use a multi-part file, all of the individual files must be identified and located. Often, there is no way to tell from the directory of files which files may be part of a multi-part file. Some extra knowledge on the part of the user is presupposed. Alternatively, all associated files of a multi-part file may be in their own directory or subdirectory. To transfer the multi-part file, all of the individual files must be identified, located and moved together. The multi-part file may then be transferred by copying or loading the multi-part file onto removable media and transferring the removable media to another computer system, by downloading the file from a server, by sharing the file over a network, by allowing the file to be accessed or downloaded using FTP, or by sending it as an attachment via e-mail.

An e-mail message may be analogized to a posted letter or piece of mail. However, instead of a physical object that is itself physically transported from a sender to a receiver, an e-mail message is an electronic representation that is communicated electronically through a communications network. Examples of communications networks used for communicating e-mail messages include, but are not limited to, tel-com networks, wide area networks (WANs), local area networks (LANs), the Internet, the World Wide Web (WWW), intranets, extranets, wireless networks, and other networks over which electronic, digital, and/or analog data may be communicated.

Figure 2:
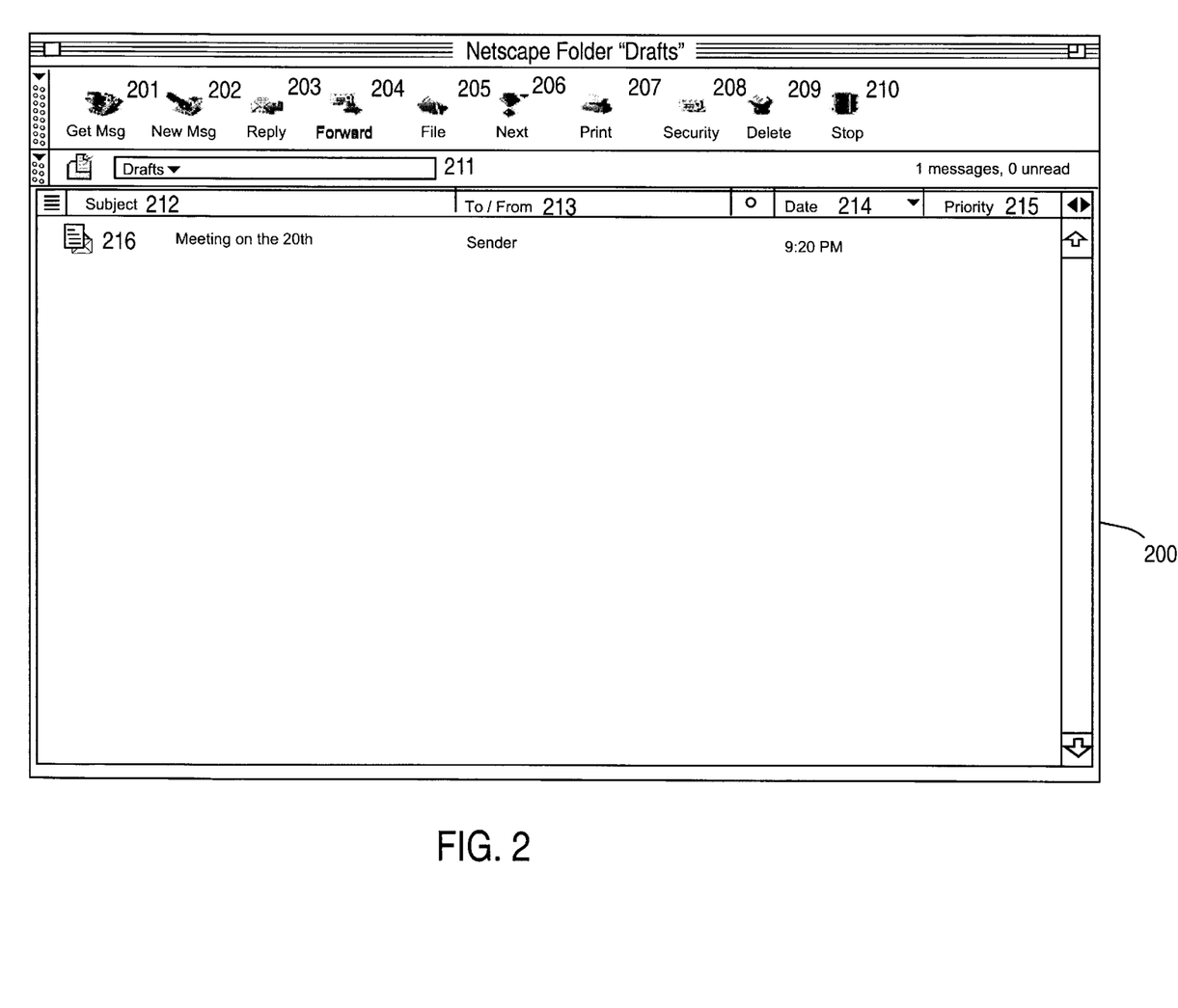
FIG. 2 illustrates the interface of an example e-mail program.

E-mail messages are created, sent, received, and read using a communications program, often referred to as a "mail" or "e-mail" application program. An image of an interface of one e-mail program is illustrated in FIG. 2. The example is the interface of the mail module of Netscape Communicator, an internet browser application. The interface consists of a window 200 with a row of control buttons 201–210 across the top, headers 212–215 below the buttons, and a field that displays a list of messages. In the example of FIG. 2, the list indicates a single message 216 represented by an icon with adjacent text indicating the subject, namely "Meeting on the 20th", from "Sender" and created at 9:20 PM.

The buttons are used to create and modify messages. Button 201, "Get Msg" is used to open a message that has been selected in the list (messages can also be opened by double clicking on them). Button 202, "New Msg" is used to create a new message form that can be completed and mailed to a receiver. "Reply" button 203 is used to generate a reply form to a message that is currently in view. When activated, a message form is generated that has as its address the address of the sender of the message being viewed. Optionally, the reply message may include the entire text of the sender's message. "Forward" button 204 generates a message form that includes the sender's message, but with a blank address, so that the message may be optionally annotated and forwarded to another receiver.

Button 205, "File", is used to save a message into a file in a text or other format. Button 206, "Print", is activated to print the message on an attached printer. "Security" button 208 activates security options for a message such as encryption, use of a digital certificate, or digital signature features, for example. Messages can be deleted by the "Delete" button 209. "Stop" button 210 is used to interrupt or stop operations.

Headers above the message list indicate such information as "Subject" 212, "To/From" 213, "Date" 214, and "Priority" 215. Messages in the list can be sorted by subject, by sender or receiver, by ascending or descending date, by urgency, or by any combination thereof.

Figure 3:
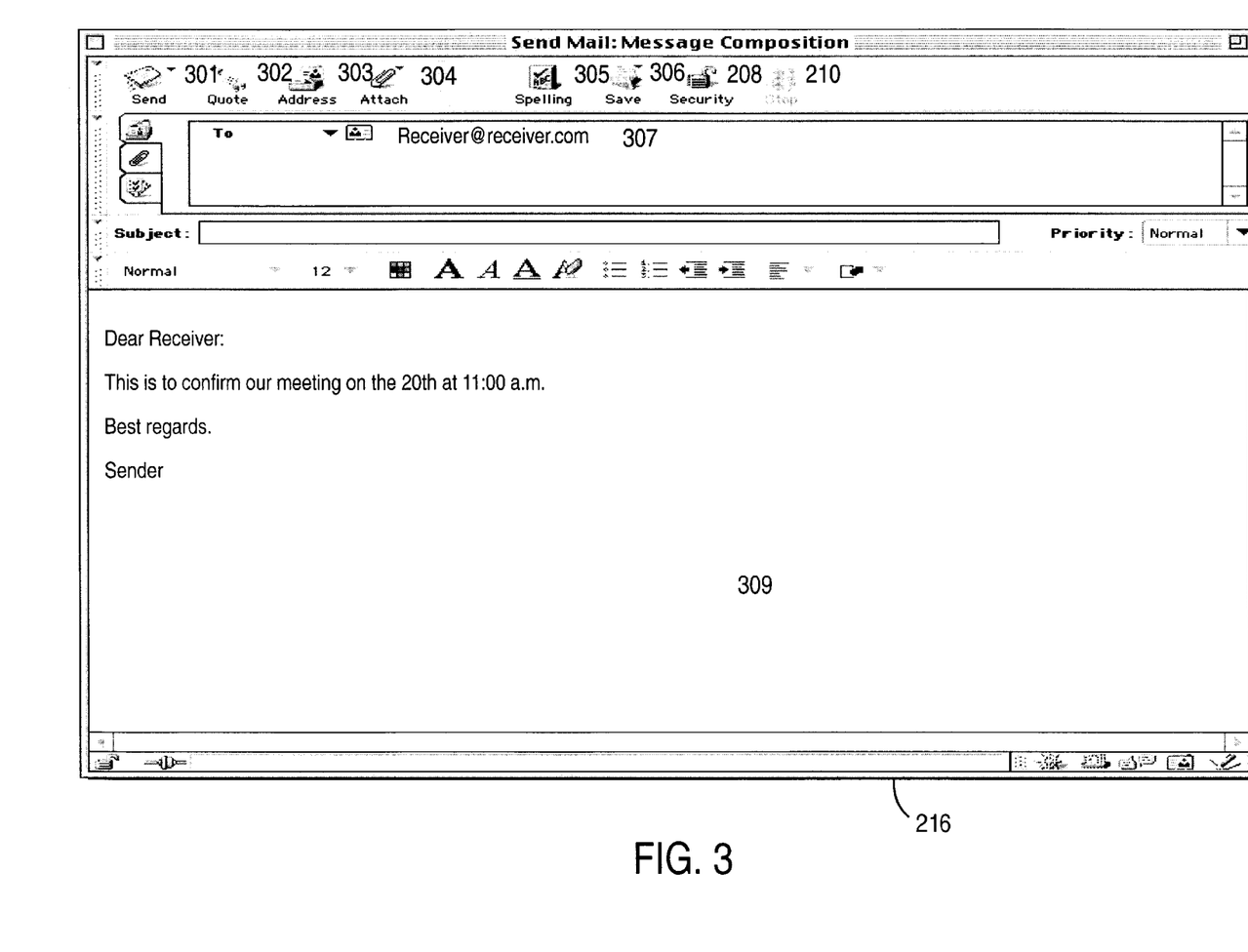
FIG. 3 illustrates a message interface of the e-mail program of FIG. 2.

An e-mail message generated using the example mail program of FIG. 2 is illustrated in FIG. 3. The e-mail message 216 includes a palette of buttons 301–306, along with buttons 208 and 210 from FIG. 2. An address field 307 indicates that the message is being sent to "Receiver@receiver.com". A subject field 308 shows the subject as "Meeting on the 20th". The body of the message is displayed in field 309.

The "Send" button 301 is activated to initiate the transmission of the message from the sender to the receiver. The "Quote" button 302 is used to insert the body of the text from a previous message into the body 309 of a current message. The "Address" button 303 prompts the sender to enter an address of the receiver or to select an address from some stored address book. The "Spelling" button 305 performs a spell check on the message text, and the "Save" button 306 is used to save a message as a text file.

The "Attach" button 304 is used to attach one or more electronic files to the e-mail message. The operation of the "Attach" feature in sending and receiving messages illustrates disadvantages and limitations of the prior art. Often a sender wishes to send one or more files to a receiver. One method of sending a file to a receiver would be to copy the information from the file (e.g. the text from a text file) and paste that information into the message field 309 of an e-mail message. If the file is large, this may not be possible. Some e-mail systems have limitations on the size of the body of an e-mail message so that some files may be too large to be entered into the body of an e-mail message. In other cases, the files represent non-text data, such as sound, images, or movies, for example, that cannot be easily pasted into an e-mail message. In such circumstances, the attach feature is used.

When the attach button 304 is activated, a dialogue box appears that allows the sender to navigate through a file system and select files to be attached to the e-mail message. After one or more files are selected, the sender transmits the e-mail message and attached file(s) to a receiver. When the receiver reads the message, there is an indicator that one or more files are attached. The receiver activates the attach button and is presented with a dialogue box that enables the receiver to retrieve the attached file or files and place them somewhere in the receiver's file system.

A problem with this prior art scheme occurs when sending multi-part files. An example of a multi-part file is a set of hypertext pages created, for example, using hyper-text mark-up language (html). Information on the World Wide Web is presented as html pages. A web site may have one or more html pages that are linked to each other through html links. A user can navigate through the pages by activating the links. In many cases, dozens of html pages are linked to each other and form a related presentation of data. Each html page is comprised of one or more separate files in a file system. To send such linked pages using e-mail, each page is attached to an e-mail message for sending to a receiver. In some cases, the multiple pages are concatenated into a single compressed file to reduce the size of the material to be transmitted from a sender to a receiver.

When an e-mail message with a compressed multi-part file is received, the receiver first retrieves the compressed attachment and places it in the receiver's file system. The receiver must then find the retrieved compressed file, initiate a decompressing program, and after decompressing the attachment, place the multiple decompressed files in the receiver's file system.

To view or use the files, the receiver activates a program capable of reading the multi-part files. In the case of html files, an internet browser such as Netscape Navigator or Microsoft Explorer may be used. The receiver must then use the open file command of the browser to locate a starting page of the multi-part file. To link to other pages in the multi-part file, it may be again necessary to use the open file command, eliminating one of the advantages of linked html files. Another problem is that when a user wishes to delete multi-part files, it is necessary to find and delete each individual file.

U.S. patents

A number of U.S. patents are related to e-mail and messaging systems and are described below:

U.S. Pat. No. 5,710,883 to Hong is directed to a method for publishing a hypertext file on a word wide web server machine by packaging the hypertext file set as an e-mail message on a client machine, transporting the e-mail message over the internet from the client machine to the word wide web server machine, unpacking the e-mail message to recover the hypertext and storing the hypertext file into a memory means on the word wide web server machine. The system is used to remotely update information at a world wide web site.

Boaz, U.S. Pat. No. 5,333,266, is directed to a method and apparatus for message handling in computer systems. The system of Boaz integrates mail from a plurality of mail servers handling messages of different media types such as text, voice, facsimile, video, and image.

U.S. Pat. No. 5,572,643 to Judson describes a method for browsing the world wide web. The system of Judson inserts status or other information when world wide web pages are being loaded.

U.S. Pat. No. 5,643,005 to Matsuo is directed to a system for message switching in an e-mail system. The system is a rules based system that checks a processing condition for processing mail messages and message contents.

Bobo, U.S. Pat. No. 5,675,507 is a message storage and delivery system. The system receives fax, voice, and data messages. Messages are stored in memory and converted into appropriate hypertext markup language files. Users are notified by e-mail when a message is in the storage system.

U.S. Pat. No. 5,706,434 to Kremen is directed to a system for creating and serving data objects among various communications protocols. A request decoder receives an incoming request, decodes the request using configuration from a configuration database.

Lagarde, U.S. Pat. No. 5,710,918 describes a method for providing web server agents on a browser client. Distributed integration solution servers execute selected capsule objects which perform programmable mass functions upon a received command.

SUMMARY OF THE INVENTION

The invention provides a system to convert multi-part files into a single file for use and transfer. The invention combines a "portable server implementation" with a concatenation of the individual files of a multi-part file to create a single file instantiation. When the single file is opened, the server controls the presentation of appropriate files of the multi-part file using standard agents on a computer. The single file can be sent from a sender to a receiver as an attachment of an e-mail message. At the receiver end, the transmitted server controls access to the multi-part attachment using standard agents and will serve the concatenated attached files to the receiver when the receiver opens the attachment.

Prepare combined file: At the sender, the set of files or "assets" to be converted into a combined file are collected into a single "result" file. A small portable server is then written to the result file to yield a combined file. The assets can be concatenated hypertext files, html files, or any other browser readable format, and may be compressed or uncompressed. The combined file can then be treated as a single file for local use or transfer.

Access combined file: When the combined file is opened or clicked, the portable server executable is started using the local operating system (O/S). The server parses the result file data to find the start of the browser readable data, opens an http port and waits for connection. The server finds a default browser on the local machine and initializes it, while requesting the browser to display the file associated with an initial URL string from the result file. All links and navigation through the attached files are handled by the server and browser.

The result of the invention is that multi-part hypertext and other browser readable files can be converted into a single combined file and opened and viewed in a single operation. The multi-part attachment also appears and behaves as a single file on the receiver machine.

DETAILED DESCRIPTION OF THE INVENTION

The invention is a method and apparatus for providing a self serving file. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Embodiment of Computer Execution Environment (Hardware)

Figure 1:
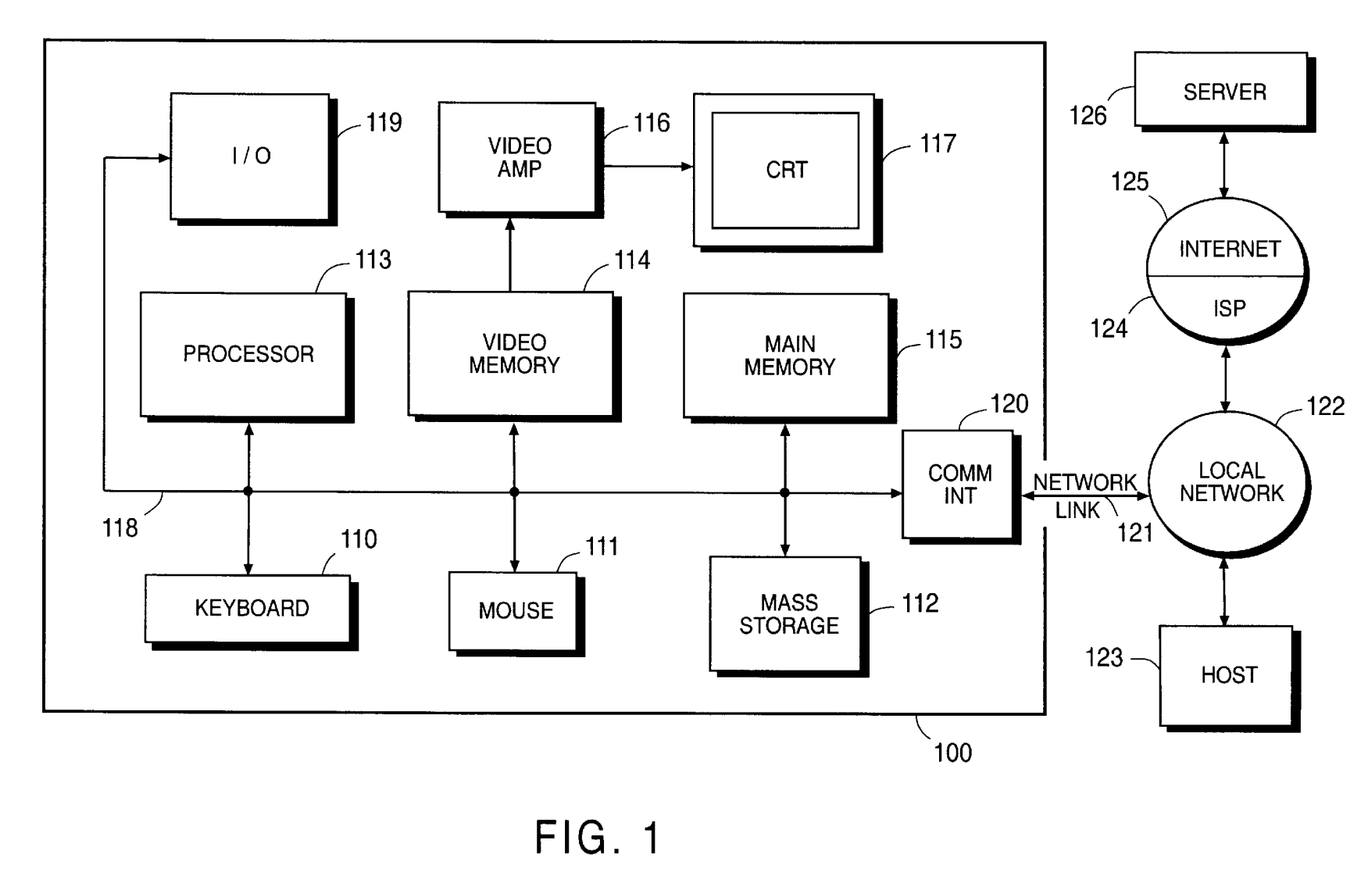
FIG. 1 illustrates an example computer system for implementing the present invention.

An embodiment of the invention can be implemented as computer software in the form of computer readable program code executed on a general purpose computer such as computer 100 illustrated in FIG. 1. A keyboard 110 and mouse 111 are coupled to a bi-directional system bus 118. The keyboard and mouse are for introducing user input to the computer system and communicating that user input to central processing unit (CPU) 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as CPU 113, main memory 115, video memory 114 and mass storage 112. Alternatively, multiplex data/address lines may be used instead of separate data and address lines.

In one embodiment of the invention, the CPU 113 is a microprocessor manufactured by Motorola®, such as the 680X0 processor or a microprocessor manufactured by Intel®, such as the 80X86, or Pentium® processor, or a SPARC® microprocessor from Sun Microsystems®. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to host computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, server 126 might transmit a requested code for an application program through Internet 125, ISP 124, local network 122 and communication interface 120.

The received code may be executed by CPU 113 as it is received, and/or stored in mass storage 112, or other non-volatile storage for later execution. In this manner, computer 100 may obtain application code in the form of a carrier wave.

The computer systems described above are for purposes of example only. An embodiment of the invention may be implemented in any type of computer system or programming or processing environment.

Creating a Combined File

In the present invention, a sender initiates creation of a combined file by selecting or compiling a directory of files to be transmitted to a receiver. These files may be hypertext files or any other type of linked file. These files are then concatenated into a single file referred to as a "result" file. This result file may then be compressed or uncompressed. To complete the creation of the combined file, a portable server executable is combined with the result file to produce a combined file. This combined file can be read, copied, transferred and otherwise treated as a single file. The data structure of the combined file in one embodiment consists of a Microsoft Windows 32 executable file followed by an OLE Structured Storage file. In another embodiment, a Microsoft Windows 32 portable executable file is followed by a Windows CAB file. A portable server that may be used with the present invention is described in "Using TCP/IP and HTTP; With CDROM, Special Edition" 1997, published by Que, and in "Microsoft Developer Network Library—January 1997", "Write a Simple HTTP-based Server Using MFC and Windows Sockets", David Cook. A method for appending a file to an executable is described in "Microsoft Cabinet Software Development Kit—Mar. 20, 1997", "Microsoft MakeCAB User's Guide", "1.3 MakeCAB over a network".

Figure 6A:
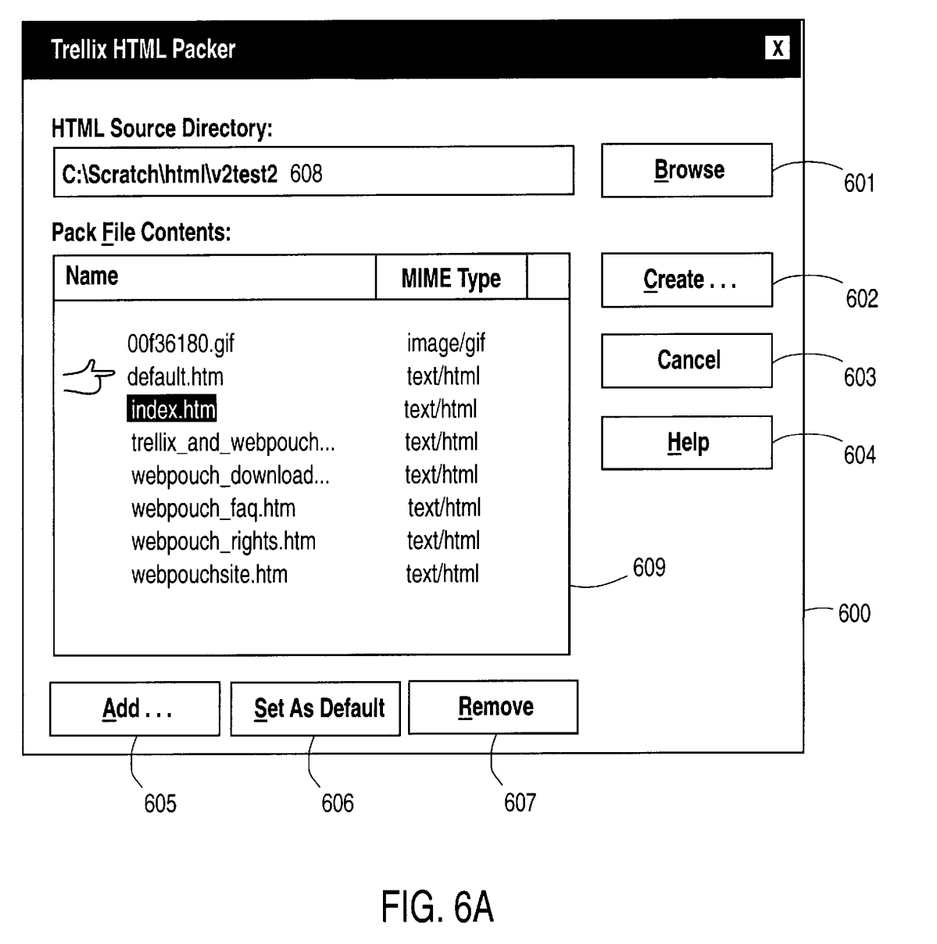
FIGS. 6A–6D illustrate interfaces of the present invention.

An interface for creating a combined file is illustrated in FIGS. 6A–6D. In FIG. 6A, Interface 600 lists the assets of a result file and a folder from which to add additional assets to the result file. Interface 600 includes a display field 608 to display the current source directory from which to select assets. Field 609 lists those assets that have already been selected for the result file. When creating a result file, one file is selected as the first page for display when the file is accessed. This is indicated by the pointer in field 609. Interface 600 includes browse button 601, create button 602, cancel button 603, help button 604, add button 605, set as default button 606 and remove button 607.

Browse button 601 is selected to look for a folder from which assets may be selected. Create button 602 is selected when all assets have been gathered and it is desired to create a combined file. When this button is activated, the assets are concatenated into a single file and combined with a portable server implementation. Cancel button 603 takes a user out of the creation process, and help button 604 provides on-line help.

Add button 605 is activated to select from the source folder those assets to be included in field 609. Set as default button 606 is used to identify which selected asset file is the default file. Remove button 607 is used to remove assets from the list in field 609.

Figure 6B:
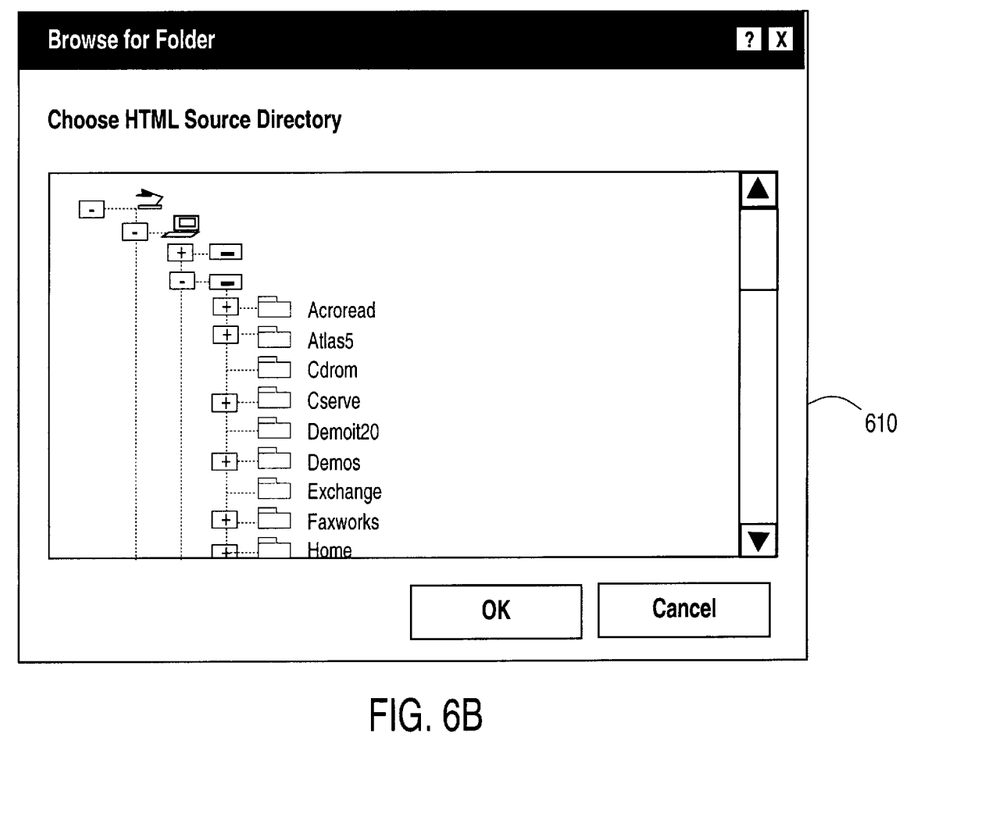

Activating the browse button 601 results in the display of interface 610 of FIG. 6B. All directories and folders can be browsed though so that one can be selected. Once a folder is selected, the "OK" button returns the user to interface 600 of FIG. 6A.

Figure 6C:
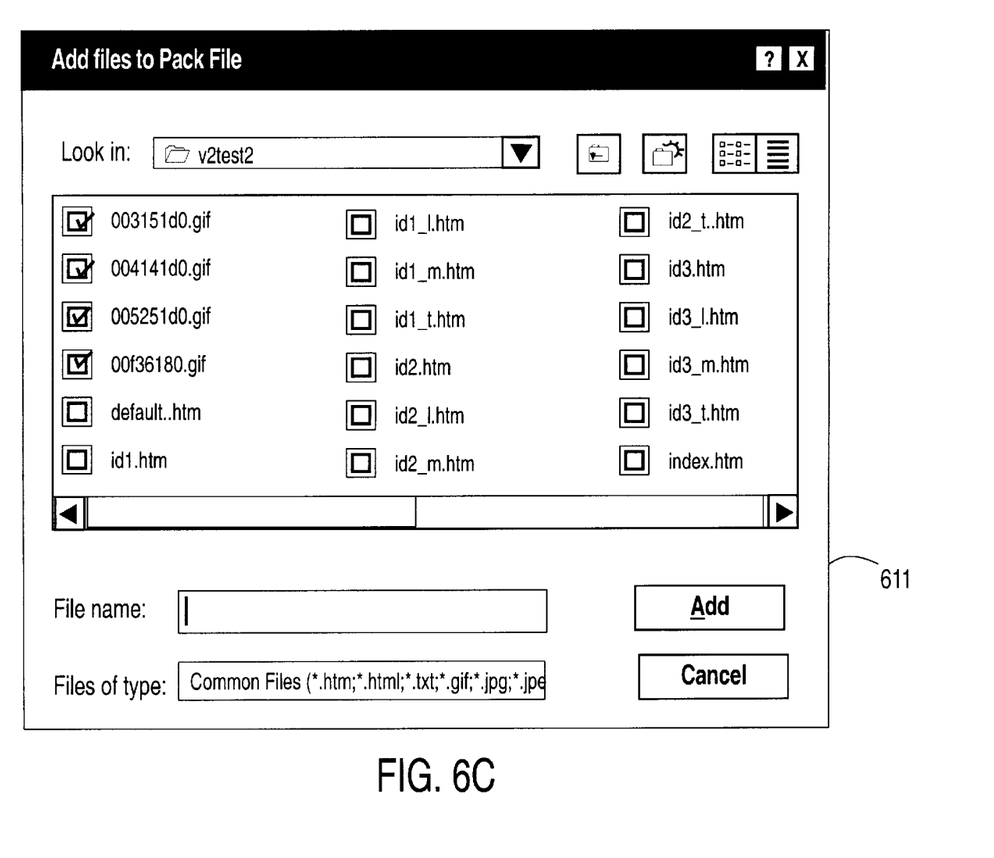

The add button 605 gives interface 611 of FIG. 6C. This interface displays the contents of the selected source folder. Individual files can be added to the result file by clicking on the Add button of interface 611.

Figure 6D:
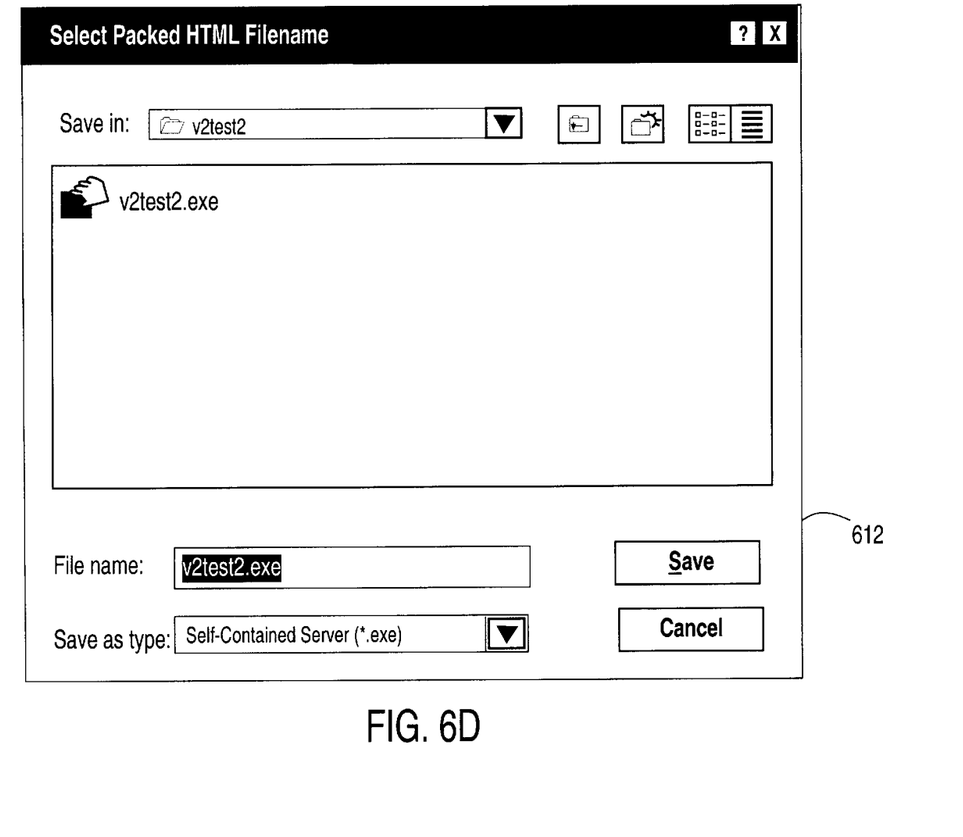

After the create button 602 is activated, the interface 612 of FIG. 6D is presented to the user. The user can determine where in the user's directories to save the combined file. The user can also give the combined file a name and determine the file type of the combined file. Selecting "save" in interface 612 concatenates the result file and combines it with a portable executable to provide a combined file.

Figure 4:
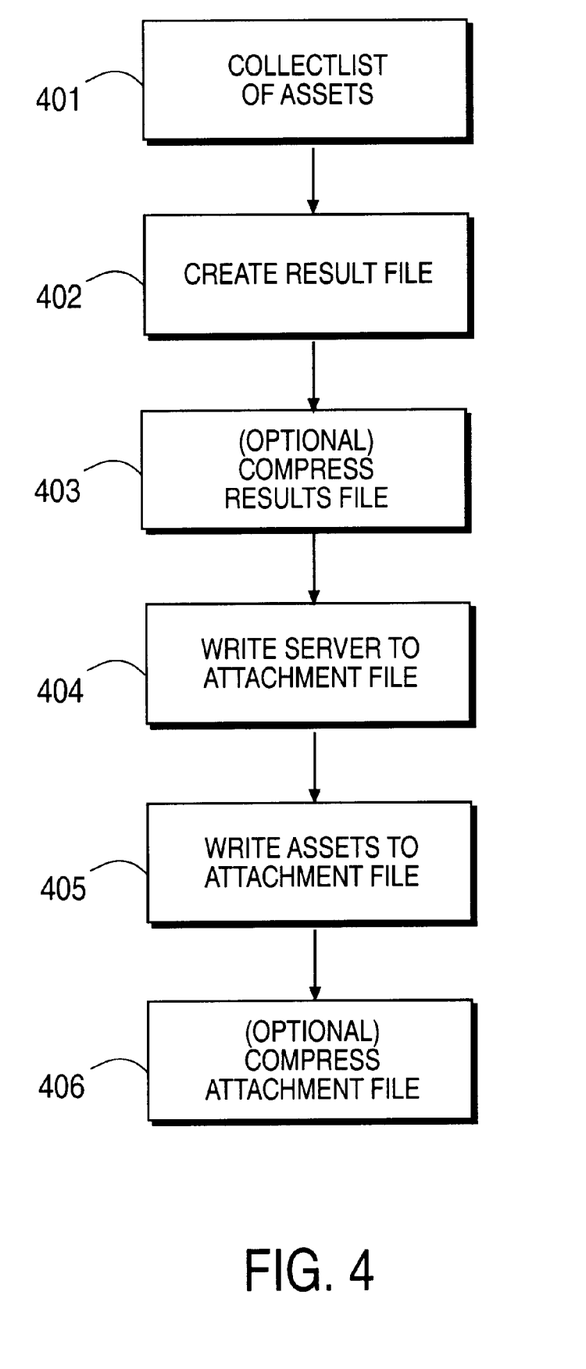
FIG. 4 is a flow diagram of the message creating process of the present invention.

As noted above, the invention results in a single file that can be used to store and view multi-part files. One embodiment of the invention is its use in creating a single attachment of multi-part files in an e-mail system. The combined file can, for example, be coupled to an e-mail message using known techniques such as those described in relationship with the example e-mail program of FIGS. 2 and 3. A flow diagram of the process of creating an attachment for an e-mail message is illustrated in FIG. 4. At step 406 a collection of files to be sent as an attachment to the e-mail message are identified or collected by the sender. In one embodiment of the invention, these files are hypertext files written in html and/or associated other data files, e.g. images, class descriptions, styles, and/or multimedia files. However, the invention contemplates the use of any files that can be read by, or converted to be read by, a browser application or any other multi-part file viewer. At step 402, these asset files are concatenated together into a single result file. This step may be accomplished by using standard concatenation tools such as those produced by Microsoft Corporation.

At step 403, the concatenated results file may be compressed. This may be accomplished using any well known compression technique, such as Zip-it, Stuff-it, or other compression techniques. At step 404, the portable server is written to the attachment file, and at step 405 the result file is written to the attachment file. Optionally, the attachment file may be compressed at step 406. The attachment is now ready to be attached to an e-mail message and forwarded to a receiver.

Reading a Combined File

A combined file appears as a single file to the user and may be stored in local memory as a single file. The user can simply double click on the combined file to begin operation of the invention so that the file can be read. This initializes the server executable which then parses the attachment file to find the start of the user identifiable data, identifies the local default browser, and opens the browser if it is not already open. (A method for parsing files is described in "Microsoft Developer Network Library—January 1997", "The Portable Executable File Format from Top to Bottom", Randy Kath. A method for starting a browser from another application is described in "Microsoft Developer Network Library—January 1997", "Product Documentation", "SDK's", "Platform SDK", "Reference", "Functions", "Win32 Functions", "SetWindowOrgEx to SUUserSaveData", "Shell Execute"). The server then generates a pointer to the first page to be displayed to the browser, based on the default page selected during creation. In one embodiment, this pointer is a URL. Thereafter, the server provides pages to the browser from the concatenated data when requested through http or other standard protocols.

Figure 5:
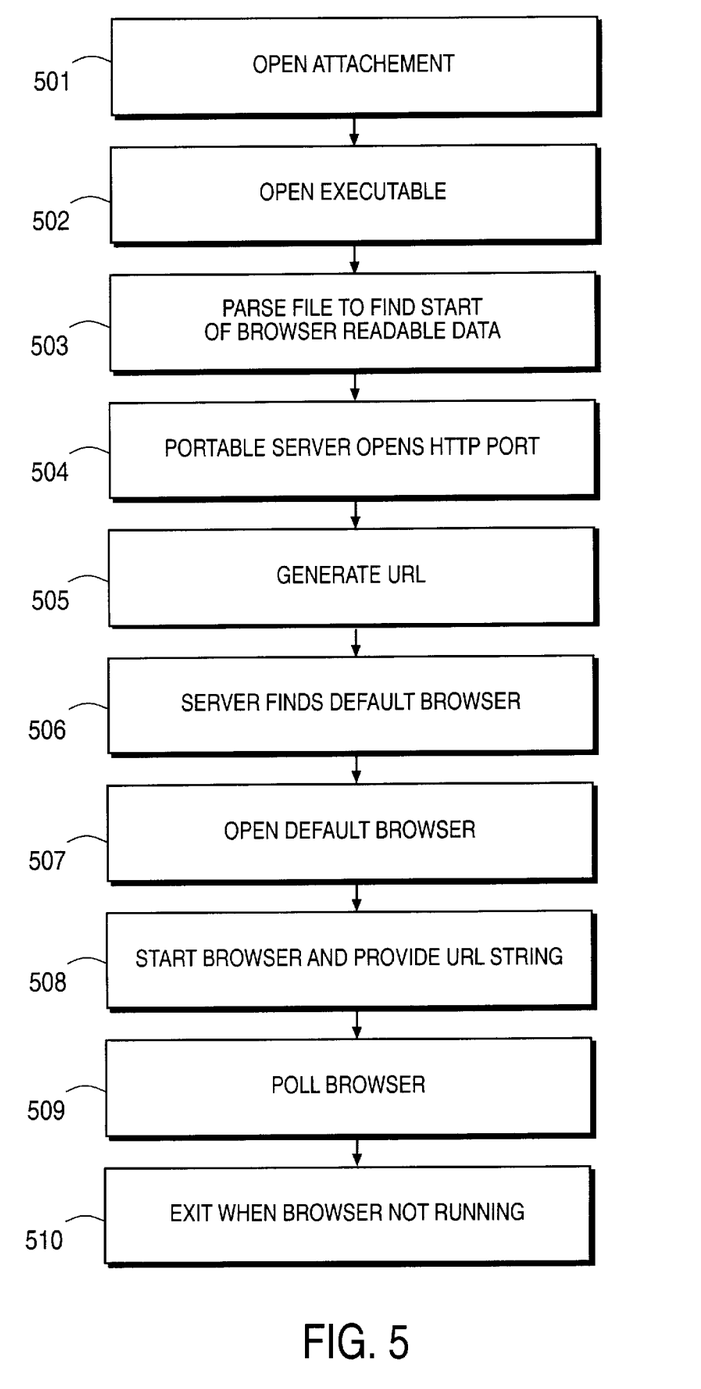
FIG. 5 is a flow diagram of the message reading process of the present invention.

The operation of the receive process in connection with an e-mail system is illustrated in FIG. 5. At step 501, the receiver opens the attachment. If necessary, the attachment is decompressed at this point. The server executable file is opened at step 502. An http port is opened at step 503. The server executable parses the attachment file at step 504 to find the start of the browser readable data. At step 505 the server generates the URL of the first page.

The server determines which asset was selected as the first page and constructs a URL to that location. All subsequent references to the concatenated data can be resolved by relative URLs to this initial location. The server generates a URL that it will recognize and use to determine which asset is being requested when it comes back from the browser through http. An example of a generated URL is:

http://localhost:8880/A:/NAME/default.htm

The URL begins with localhost followed by a generic port number. The port number is a generic port (in this embodiment, port 8880), and is followed by the path name of the file on the local machine.

Alternatively, the server could modify URLs in the concatenated data by some other mechanism such that they will be recognized by the server to identify assets to be retrieved from the concatenated data.

At step 506 the server opens an http port and waits for a connection. At step 507 the server identifies the default browser of the receiver computer. The server checks to see if the browser is already running. If not, the server opens the default browser at step 508. After the browser has been opened, or if the browser is already running, the system provides the generated URL of the default first page of the combined file. If no browser has been found or can be opened, the system provides the generated URL in a dialogue box so that it could be used in whatever browser the user may activate to select and display the first page. The browser then displays the first page of the multi-part file. As the receiver navigates through the multi-part file, the server provides pages and links as requested. At step 509 the server periodically polls the browser to see if the browser is running. If not, the server exits at step 510.

Normally, for security, the server only serves pages to client applications running on the computer on which it is resident, denying all other requests. There is also no need for any link to an Internet Service Provider (ISP) during operation of the server. The server operates locally on the receiver computer. If the receiver computer is connected to the Internet through a proxy server, and is configured to disallow connections to the local host, the user is notified and encouraged to reconfigure the browser to allow local connections.

Thus, a method and apparatus for creating a combined file has been described.

I claim:

1. A memory medium readable by a machine tangibly embodying, a combined file said combined file comprising data accessible by a computer program being executed on said machine, said data comprising:
    a first set of data comprising at least one hypertext file;
    a second set of data comprising a portable server executable file, said portable server executable file comprising a pointer to at least one of said at least one hypertext files, wherein said pointer provides said computer program with a start location.

2. An article of manufacture having computer readable program code comprising:
    computer readable program code configured to cause a computer to concatenate one or more files into a results file;
    computer readable program code configured to cause a computer to write said results file and a portable server executable into a single combined file;
    computer readable program code configured to cause a computer to provide to said server executable a pointer to said results file.

3. The article of manufacture of claim 2 wherein said one or more files comprise hypertext files.

4. The article of manufacture of claim 3 wherein said pointer comprises a URL.

5. The article of manufacture of claim 4 further including:
    computer readable program code configured to cause a computer to initiate a browser when said server executable is activated.

6. The article of manufacture of claim 5 further including:
    computer readable program code configured to cause a computer to provide said URL to said browser.

7. The article of manufacture of claim 6 further including:
    computer readable program code configured to cause a computer to use said browser to display information associated with said URL.

8. A method for providing a self-serving file comprising:
    concatenating one or more files into a results file;
    writing said results file and a portable server executable into a single combined file;
    providing said portable server a pointer to said results file.

9. The method of claim 8 wherein said one or more files comprise hypertext files.

10. The method of claim 8 wherein said pointer comprises a URL.

11. The method of claim 10 further comprising:
    initiating a browser when said server executable is activated.

12. The method of claim 11 further comprising:
    display information associated with said URL in said browser.

13. An apparatus for providing a self-serving file comprising:
    a computer processor;
    an output device;
    a computer processor usable medium having computer processor readable program code embodied therein for providing a self-serving file, said computer processor readable program code comprising:
        computer readable program code configured to cause a computer to concatenate one or more hypertext files into a results file;
        computer readable program code configured to cause a computer to write said results file and a portable server executable into a single combined file;
        computer readable program code configured to cause a computer to provide said portable server executable a pointer to said results file.

14. The apparatus of claim 13 wherein said pointer comprises a URL.

15. The apparatus of claim 14 further comprising:
    computer readable program code configured to cause a computer to initiate a browser when said server executable is activated.

16. The apparatus of claim 14 further comprising:
    computer readable program code configured to cause a computer to use said browser to display information associated with said URL.

17. A computer processor usable medium having computer readable code embodied therein for providing a self-serving document, said computer readable code comprising:
    computer readable program code configured to obtain a combined file, said combined file comprising a first set of data comprising at least one hypertext file and a second set of data comprising a portable server executable file having a pointer from said portable server executable file to at least one of said at least one hypertext files;
    computer readable program code configured to execute said portable server executable file, said portable server executable file comprising computer readable program code configured to use said pointer to locate said at least one hypertext file.

18. The computer processor usable medium of claim 17 wherein said portable server executable file locates a browser.

19. The computer processor usable medium of claim 18 wherein said browser displays said at least one hypertext file.

20. The computer processor usable medium of claim 18 wherein said portable executable server file obtains hypertext files associated with said at least one hypertext file.

21. The computer processor usable medium of claim 20 wherein said portable executable server file obtains said hypertext files associated with said at least one hypertext file from said combined file.

22. The computer processor usable medium of claim 20 wherein said portable executable server file obtains said hypertext files associated with said at least one hypertext file from a network source.

23. A method for providing a self-serving email comprising:
    obtaining a combined file, said combined file comprising a first set of data comprising at least one hypertext file and a second set of data comprising a portable server executable file having a pointer from said portable server executable file to at least one of said at least one hypertext files;
    executing said portable server executable file, said portable server executable file comprising a pointer;

using said pointer to locate said at least one hypertext file.

24. The method of claim 23 wherein said portable server executable file locates a browser.

25. The method of claim 24 wherein said browser displays said at least one hypertext file.

26. The method of claim 23 wherein said portable executable server file obtains hypertext files associated with said at least one hypertext file.

27. The method of claim 26 wherein said portable executable server file obtains said hypertext files associated with said at least one hypertext file from said combined file.

28. The method of claim 27 wherein said portable executable server file obtains said hypertext files associated with said at least one hypertext file from a network source.

29. The method of claim 23 wherein said pointer comprises a URL.

30. The method of claim 23 further comprising:

initiating a browser when said server executable is activated.

31. The method of claim 29 further comprising:

displaying information associated with said URL using said browser.

32. The method of claim 29 wherein said URL data is obtained from said portable server executable file.

* * * * *